United States Patent [19]

Jenson

[11] Patent Number: 5,201,168
[45] Date of Patent: Apr. 13, 1993

[54] UNDERWATER WEED CUTTING APPARATUS

[76] Inventor: Benjamin J. Jenson, Rte. 1, Box 198, Dent, Minn. 56528

[21] Appl. No.: 833,104

[22] Filed: Feb. 10, 1992

[51] Int. Cl.⁵ .................................................. A01D 44/00
[52] U.S. Cl. .......................................... 56/8; 56/260; 56/299
[58] Field of Search ............... 56/8, 9, 260, 261, 262, 56/263, 296, 299, 257, 264; 440/71, 73; 37/63, 78

[56] References Cited

U.S. PATENT DOCUMENTS

| | | | |
|---|---|---|---|
| 3,499,271 | 3/1970 | Drigert et al. | 56/8 |
| 4,196,566 | 4/1980 | Donnelley | 56/8 |
| 4,202,155 | 5/1980 | Stewart | 56/9 |
| 4,375,299 | 3/1983 | Laven | 294/19 R |
| 4,416,106 | 11/1983 | Hawk | 56/8 |
| 4,718,871 | 1/1988 | Mendelevitch | 440/71 |
| 4,885,902 | 12/1989 | Schmidt | 56/257 X |

FOREIGN PATENT DOCUMENTS 852448  9/1970  Canada ..................................... 56/8

Primary Examiner—Terry Lee Melius
Attorney, Agent, or Firm—Haugen and Nikolai

[57] ABSTRACT

An underwater lake weed cutting apparatus which is adapted to be driven by an electric auger motor from the rear portion of a boat. The weed cutting apparatus includes an elongated drive shaft extending through an elongated tubular housing, wherein the drive shaft is driven by the motor to consequently reciprocate a sickle bar at a lower end thereof. A geared driving mechanism converts rotary motion of the drive shaft to a reciprocating motion of a sickle bar to reciprocate a first elongated toothed cutting blade with respect to an identical second toothed cutting blade to generate a scissors action. The scissors action of the sickle bar severs lake weeds as the apparatus is swept through the water proximate the lake bottom by a boat. The cutting apparatus can be adjusted to various depths of water to facilitate cutting lake weeds proximate the root structure near the lake bottom. The invention provides a mechanized method of cutting lake weeds such that the task of cutting lake weeds requires less labor, and wherein the cutting apparatus is easily maneuverable around fixed structures such as docks. The invention comprises mostly aluminum steel parts such that it is relatively light weight. Since the sickle bar comprises reciprocating blades, weeds do not have attendancy to build up upon the cutting apparatus. The invention is portable and can be adapted to the front wall of a boat as well, and further, the cutting apparatus can be angled from the boat at a preselected angle to facilitate viewing the cutting blades as they are swept through the lake to cut the weeds.

10 Claims, 1 Drawing Sheet

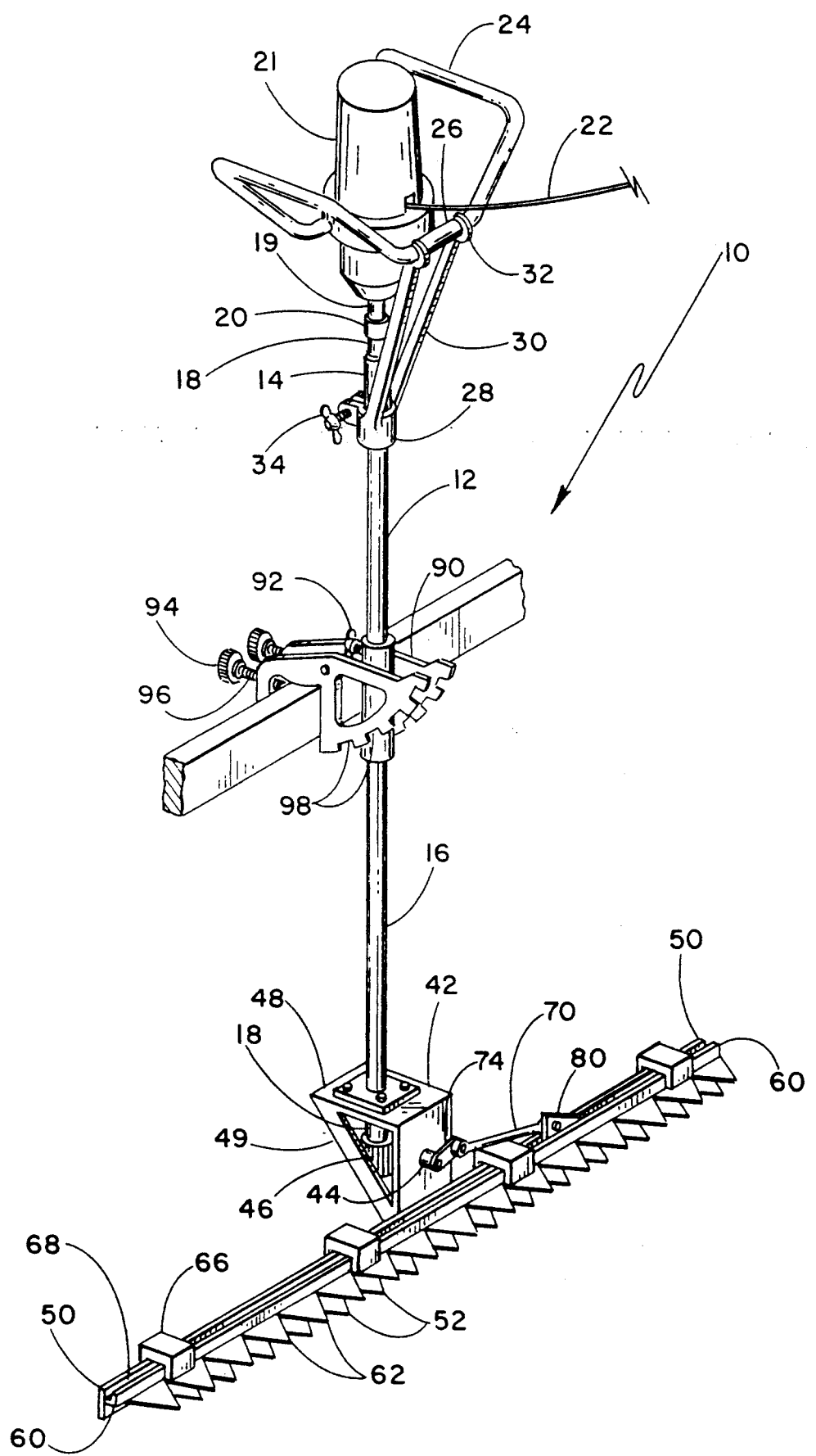

UNDERWATER WEED CUTTING APPARATUS

BACKGROUND OF THE INVENTION

I. Field of the Invention

This invention relates generally to equipment which is suitable for removing weeds and, more particularly, to a cutting apparatus which can be adapted to a motor from an ice auger assembly for cutting weeds growing from a lake bottom.

II. Discussion of the Prior Art

Lake weeds are an annual problem to a lake shore owner wherein at least several times a year the task of removing these unattractive weeds is undertaken. Just as soon as the lake weeds are cut each time, it seems the lake weeds grow back so quickly that it is hardly worth expending the effort and labor to repeatedly remove the weeds. Operating equipment in water, especially deeper water, is both time consuming and a very laborious task. Further, the problem of removing these weeds is substantially more difficult than removing weeds that grow on land because most commercially available weed removing equipment is relatively ineffective or unsuitable for use below water. For example, electrical equipment further poses the problem of possible electrocution risks. Thus, present methods of removing lake weeds are only moderately effective when operated underwater.

One well known method of removing lake weeds is to manually rake the lake bottom using a standard garden rake. This method is cumbersome, frustrating and very tiring as it requires extensive manual labor and time. Further, water near the lake bottom typically becomes cloudy while using the rake and thus inhibits the owner from visually observing the area of the lake bottom that the owner is trying to clear of weeds. Moreover, the rake needs to be periodically removed from the water to remove tangled weeds from the teeth, which is also a laborious and time consuming task. Finally, the rake only removes a portion of the weeds with each stroke such that several strokes are usually necessary to satisfactorily clear a portion of the lake bottom of weeds.

U.S Pat. No. 4,375,299 teaches an aquatic weeder having a flat blade sandwiched between a pair of rigid support plates. An elongated handle is used to drag the sharpened blade across the lake bottom to cut lake weeds. This invention may be an improvement to the rake, however, the blade is only moderately effective at cutting thick patches of lake weeds because weeds will build up around the blade thus limiting the effectiveness of this invention. Further, this invention requires the lake owner to manually operate the weeder is water which is time consuming and of very laborious task. Finally, weeds will have attendancy to wrap around the support straps thus providing further drag to the invention thus making the task even more laborious.

U.S. Pat. No. 4,196,566 teaches an aquatic weed cutter having a pair of circular cutting blades each disposed at the end of a drive shaft. A motor rotates each drive shaft via a hydraulic pump to rotate each circular blade in opposite directions to cut the weeds. This invention is rather complex and difficult to maneuver, such as proximate docks or a floating recreation raft. Further, this invention is relatively expensive and thus is not affordable to the average lake owner. Finally, this invention is not portable since it is integrally adapted to a floating vehicle such as a boat.

U.S. Pat. No. 4,202,155 teaches an aquatic weed cutter, derooter and harvester. This invention is rather complex as it teaches both a weed severing means and fortex generators. A mower assembly having reciprocating knife blades is shown which is hydraulically driven as shown in FIG. 2. This invention is not portable or easily attached to the rear portion of a boat. Further, the hydraulic driving mechanism to drive the mower assembly is expensive and complex.

U.S. Pat. No. 4,416,106 teaches a method and apparatus for removal of aquatic plant growth. This invention teaches a horizontally oriented bar which is attached to a boom extending from the lower portion of a boat. The plant stalks wrap themselves around the bar such that the weeds are either broken or removed by their roots from the lake bottom as the horizontal bar is dragged across the lake bottom. This invention requires the horizontal bar to periodically be removed from the water to facilitate weed removal. This task is both time consuming, tedious and laborious. Further, this invention is rather large, expensive, and not easily maneuvered as it is extending from a floating vessel.

There is a need for a weed removing apparatus which can be easily maneuvered underwater, which is powered to reduce the labor required by the operator to effectively operate the device, and finally, for a device which is portable and relatively inexpensive for which an average lake shore owner can afford and easily operate.

OBJECTS

It is accordingly a principle object of the present invention to provide a lake weed removing apparatus which is mechanized to reduce the work load of the operator and to reduce the time required to cut weeds.

A further object of the present invention is to provide a weed cutting apparatus which can be easily maneuvered under water.

A further object of the present invention is to provide a weed cutting apparatus which is adapted to be driven by a power source residing above water.

A further object of the present invention is to provide a weed cutting apparatus which can be used at various depths of water along a lake shore to facilitate cutting the lake weeds proximate the roots.

A further object of the present invention is to provide a weed cutting apparatus which is adapted to be driven by a commercially available motor, such as an ice auger motor.

SUMMARY OF THE INVENTION

The foregoing features and objects are achieved by providing a weed cutting apparatus having a pair of sharpened blades wherein one is reciprocated with respect to the other and which is adapted to be driven by a motor such as a standard electric motor adapted to power an ice auger. The present invention comprises an underwater weed cutting apparatus adapted to be driven by a first drive shaft of a motor, such as an auger motor, and includes an elongated tubular housing having a first end adapted to be coupled to the motor and a second end. A second drive shaft extends within the tubular housing and is adapted to be coupled to the first drive shaft of the motor. The second drive shaft extends to the second end of the tubular housing. Driving means is coupled to the second end of the tubular housing and includes a conversion means coupled to the second drive shaft for converting rotary motion to reciprocating motion. Cutting means is coupled to the driving means and extends transversely to the tubular housing. The cutting means comprises a first sharpened cutting member fixedly attached to the driving means and has a first plurality of teeth. The cutting means also comprises a second sharpened cutting member extending substantially parallel to the first sharpened cutting member and has a second plurality of teeth defined proximate the first plurality of teeth. The second sharpened member is coupled to the conversion means of the driving means such that the conversion means is adapted to reciprocate the teeth of the second cutting member past the teeth of the first cutting member for severing the weeds positioned between the adjacent teeth when the second drive shaft is rotated.

In the preferred embodiment, the cutting means is oriented perpendicular to the tubular housing and extends each side of the tubular housing to form a T-shape. The driving means preferably comprises a Pitman type device.

The invention preferably includes a fastening means coupled to the tubular housing which is adapted to attach the cutting apparatus to a boat. Preferably, the fastening means comprises a clamp such as a C-clamp, which is adapted to fasten the invention to a rear wall of a boat.

A standard electric motor, such as the motor from an auger, can be adapted to the present invention to drive the second drive shaft extending within the tubular housing. Thus, the motor drives the cutting means in a reciprocating fashion via the second drive shaft and the driving means such that the cutting means can be maneuvered and operated underwater wherein the motor resides above the surface of the water.

The elongated tubular housing is extendable to various depths to facilitate cutting weeds proximate the lake bottom. As the boat is maneuvered through the water, weeds are severed proximate their roots by the cutting means of the present invention. The present invention is easily adapted to the rear wall of a boat and can be conveniently removed from the boat for storage.

The foregoing features, objects, and advantages of the invention will become apparent to those skilled in the art from the following detailed description of the preferred embodiment, especially when considered in conjunction with the accompanying drawing.

BRIEF DESCRIPTION OF THE DRAWINGS

FIG. 1 is a prospective view of an underwater weed cutting apparatus according to the present invention including a pair of elongated cutting blades adapted to be driven in a reciprocating motion by a separate electric ice auger motor.

DESCRIPTION OF THE PREFERRED EMBODIMENT

In accordance with the preferred embodiment of the present invention, and with particular attention to FIG. 1, an underwater weed cutting apparatus is generally shown at 10. Cutting apparatus 10 comprises an elongated round tubular housing 12 extending from an upper end 14 to a lower end 16. Housing 12 includes an opening extending from end 14 to end 16 and which receives an elongated rod or drive shaft 18 which can be rotated about a common axis thereof. Drive shaft 18 extends above upper end 14 and has an upper end coupled by a cylindrical coupler 19 to a drive shaft 20 of an electric drive motor 21, such as a 12 volt electric auger motor which is also adaptable to a standard commercially available ice auger blade. However, a gasoline powered motor could be used as well, and limitation to an electric motor is not to be inferred. Motor 21 is powered via an insulated electrical conductor 22, which for example, is connected to a battery or a generator. Shaft 18 is securingly connected to drive shaft 19 of motor 21 such that when motor 21 operates, shaft 18 is rotated therewith. Motor 21 includes a continuous handle 24 which defines a hand grip portion on each side of motor 21, wherein a horizontal segment 26 is reinforced with respect to housing 12 by a reinforcement member 28. Reinforcement member 28 includes a pair of rigid elongated arms 30 each extending upwardly to form a C-shaped notched distal end 32 for receiving and engaging segment 26. A C-shaped lower portion of reinforcement member 28 is selectively positioned along housing 12 and can be securably attached to or removed from housing 12 by tightening or loosening, respectively, a butterfly shaped bolt 34 extending through a rear portion of member 28.

A gearing device 40 is securably attached to lower end 16 of housing 12 and comprises a 90 degree gearing mechanism, such as a Pitman device. Gearing device 40 includes a vertical box-like housing 42 containing a conversion mechanism including a horizontal shaft 44 extending into housing 42 to a geared end (not shown) which rotatably engages a geared lower end 46 of drive shaft 18 for converting rotary motion of drive shaft 18 90-degrees to rotary motion of shaft 44. Thus, shaft 44 rotates in unison with drive shaft 18. This 90-degree gearing mechanism is well-known in the art. Gearing device 40 also includes a plate 48 extending horizontally from an upper portion of housing 42 and is fixedly connected to lower end 16 of housing 12. A support arm 49 extends at approximately a 45 degree angle from a distal edge of horizontal plate 48 to the lower portion of vertical housing 42 for structural reinforcement.

A cutting mechanism or sickle bar is fixedly attached to the lower portion of housing 42 and which includes a first elongated knife-blade 50 which is fixedly attached about a midsection thereof to the lower portion of housing 42. Member 50 extends transversely and preferably perpendicular to housing 12 to form a T-shape. However, member 50 could be adapted to extend to only one side of housing 12 to form an L-shape, and limitation to a T-shape is not to be inferred. Cutting member 50 includes a plurality of sharpened, uniformly spaced, triangularly shaped cutting teeth 52 each extending outwardly and away from gearing device 40. A second elongated cutting blade member 60 is slidably positioned upon and parallel first blade member 50 and includes a second plurality of uniformly spaced sharpened teeth 62. Each of four rigid C-shaped guides 66 are fastened to a lower portion of first blade member 50 and extend over second blade member 60 for providing a guide for second blade member 60. Each guide member 66 is evenly spaced from one another and allows movement of second blade member 60 only in the lateral direction along and above first blade member 50. In essence, first blade member 50 and second blade member 60 form a standard sickle blade bar which is well known in the art. Second blade member 60 also includes an elongated rectangular guide member 68 extending upwardly and along the entire length thereof which in combination with clamps 66 provides a guide means such that second blade member 60 is slidable in the lateral direction only.

A rigid arm 70 is pivotably attached at one end to a cam 74 which is integrally formed at a proximal end of shaft 44. The opposite end of rigid arm 70 is pivotably attached to a triangularly shaped fastening member 80 which is securingly attached to an upper portion of slidable second blade member 60 proximate one end thereof. However, limitation to a triangularly shaped fastening member 80 is not to be inferred. Consequently, when cam 74 is rotated by shaft 44 in response to rotating shaft 18, rigid arm 70 in turn will reciprocate in the lateral direction thus reciprocating member 80 as well to reciprocate second blade member 60 back and forth upon first blade member 50, thus producing a scissors action. Thus, the rotary motion of drive shaft 18 is converted to a rotary motion of shaft 44, and finally to a reciprocating motion of rigid arm 70 and consequently second sharpened knife member 60.

An adjustable dual clamp 90 is selectively attached to and about a mid-section of housing 12, and can be secured by rotating a butterfly nut 92. A pair of rotatable elliptical handles 94 can be rotated to advance a bolt 96 connected thereto to engage a rear wall of a boat to secure cutting apparatus 10 thereto. By loosening nut 92, apparatus 10 can be adjusted vertically to orient cutting members 50 and 60 proximate the lake bottom, in both shallow and deeper water. Clamp 90 also includes a plurality of notches 98 such that cutting apparatus 10 can be angled outwardly from the boat at a desired angle to visually observe the sickle bar. Clamp 90 is well known in the art.

In conclusion, weed cutting apparatus 10 is operated by energizing motor 21 such that drive shaft 19 of motor 21 rotates drive shaft 18 within housing 12. Gear 46 which is defined at the lower end of shaft 18 in turn rotates the geared end of shaft 44 (not shown) such that shaft 44 is rotated. Cam 74 of shaft 44 in turn reciprocates second blade member 60 laterally upon first blade member 50 to form a scissors action between the respective teeth.

Motor 21 can be disassembled from weed cutting apparatus 10 by loosening both bolt 34 and coupler 20, and sliding reinforcement member 28 downwardly along housing 12 such that notches defined in distal end 32 of member 30 slide away from handle segment 26. Subsequently, motor 21 can be removed from apparatus 10. Arms 30 prevent motor 21 from rotating with respect to housing 12.

The invention has been described here in considerable detail in order to comply with the patent statutes and to provide those skilled in the art with the information needed to apply the novel principles and to construct and use such specialized components as are required. However, it is to be understood that the invention can be carried out by specifically different equipment and devices, and that the various modifications, both as to the equipment details in operating procedures, can be accomplished without departing from the scope of the invention itself.

What is claimed is:

1. An underwater weed cutting apparatus adapted to be selectively attached to and driven by a first drive shaft of a motor, such as in ice auger motor, comprising:
    (a) an elongated tubular housing having an upper first end adapted to be selectively coupled to the motor, and a lower second end;
    (b) a second drive shaft extending within said tubular housing having an upper end adapted to be selectively coupled to and driven by said first drive shaft of the motor proximate said upper first end of said tubular housing, said second drive shaft extending to said lower second end of said tubular housing;
    (c) coupling means coupled to said lower second end of said tubular housing and having a conversion means coupled to said second shaft drive for converting rotary motion to reciprocating motion; and
    (d) cutting means coupled to said coupling means and extending transversely to said tubular housing, said cutting means comprising a first sharpened cutting member fixedly attached to said coupling means and having a first plurality of teeth, said cutting means also comprising a second sharpened cutting member extending substantially parallel to said first sharpened cutting member and having a second plurality of teeth defined proximate said first plurality of teeth, wherein said second sharpened member is coupled to said conversion means of said coupling means such that said conversion means is adapted to reciprocate said teeth of said second cutting member for severing the weeds positioned between the adjacent teeth of said first and second cutting members when said second drive shaft is rotated.

2. The cutting apparatus as specified in claim 1 wherein said cutting means is oriented perpendicular to said tubular housing.

3. The cutting apparatus as specified in claim 2 wherein said cutting means extends each side of said tubular housing to form a T-shape.

4. The cutting apparatus as specified in claim 1 wherein said driving means comprises a Pitman-type device.

5. The cutting apparatus as specified in claim 4 wherein said second drive shaft has a shape adapted to be coupled to a standard ice auger motor.

6. The cutting apparatus as specified in claim 1 further comprising fastening means coupled to said tubular housing which is adapted to attach said cutting apparatus to a boat.

7. The cutting apparatus as specified in claim 6 wherein said fastening means comprises a clamp.

8. The cutting apparatus as specified in claim 6 wherein said tubular housing is extendable relative to said fastening means to facilitate orienting said cutting means above the lake bottom.

9. The cutting apparatus as specified in claim 1 further comprising at least one reinforcement member connected to said housing and adapted to be fixedly attached to the motor.

10. The cutting apparatus as specified in claim 9 wherein said reinforcement member extends upwardly to a C-shaped notch adapted to receive a handle of the motor.

* * * * *